No. 796,449. PATENTED AUG. 8, 1905.
S. N. RAPP.
AIR PUMP FOR AUTOMOBILES.
APPLICATION FILED AUG. 10, 1903.
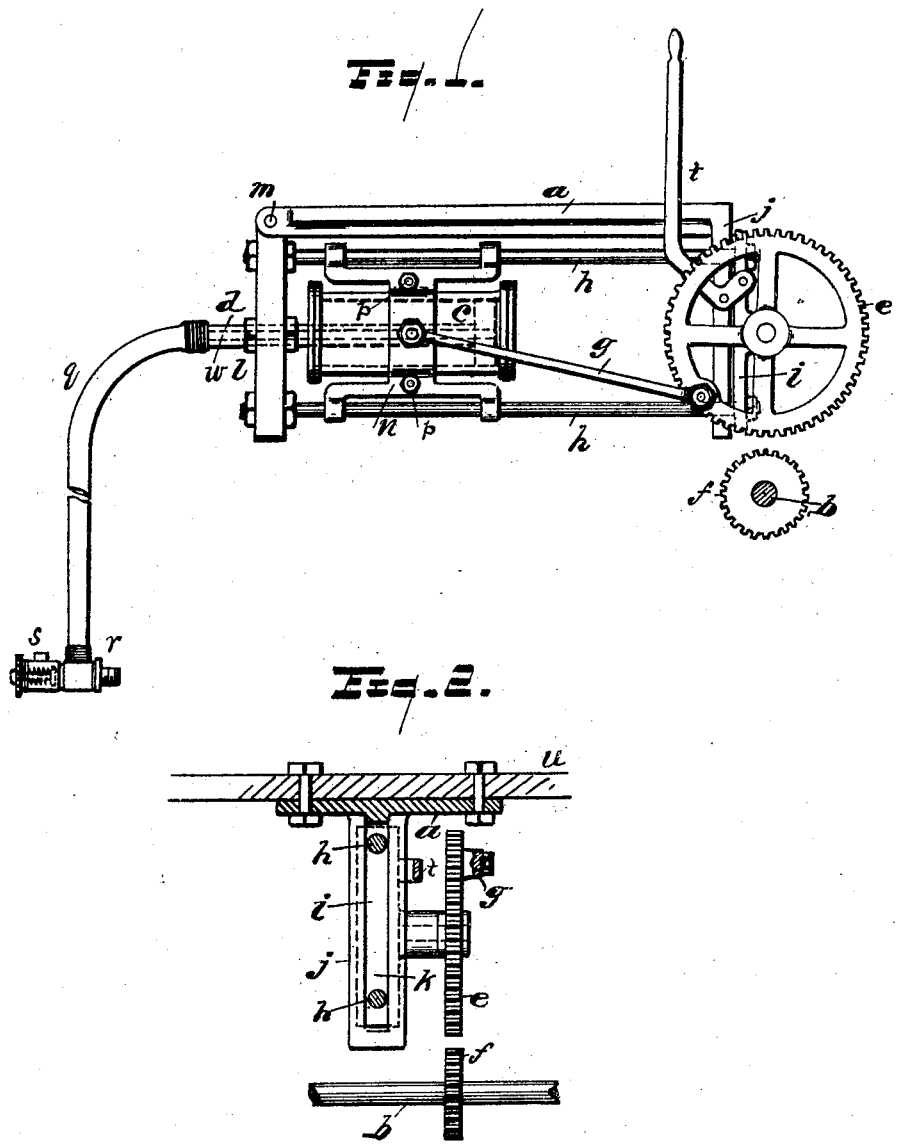

UNITED STATES PATENT OFFICE.

SAMUEL N. RAPP, OF DETROIT, MICHIGAN, ASSIGNOR OF ONE-HALF TO ALVIN S. CLARK, OF DETROIT, MICHIGAN.

AIR-PUMP FOR AUTOMOBILES.

No. 796,449.  Specification of Letters Patent.  Patented Aug. 8, 1905.

Application filed August 10, 1903. Serial No. 168,853.

*To all whom it may concern:*

Be it known that I, SAMUEL N. RAPP, a citizen of the United States, residing at Detroit, county of Wayne, State of Michigan, have invented a certain new and useful Improvement in Air-Pumps for Automobiles and Analogous Devices, of which the following is a specification, reference being had to the accompanying drawings, which form a part of this specification.

My invention has for its object to provide an automatic air-pump, the same being more especially adapted and designed for attachment to automobiles to pump up or inflate the tires, the operation being accomplished by the power which drives the automobile, the pump being more particularly arranged to be thrown into operation when the wheels are standing still and the driving-shaft of the power propelling the automobile is in motion.

My improved pump attachment may be applied to automobiles of various constructions, whether propelled by internal-combustion engines or otherwise—as by electricity or steam, for example.

To this end my invention consists of the construction, combination, and arrangement of devices hereinafter described and claimed and illustrated in the accompanying drawings, in which—

Figure 1 is a side elevation. Fig. 2 is a vertical section on the line 2 2, Fig. 1.

The desirability of an automatic pump for inflating the tires of automobiles and similar mechanism is evident, wherein the pump is driven by the power propelling the automobile. Such a device will of course dispense with the use of a hand-pump for this purpose and the labor thereby required, while at the same time by the employment of a safety-valve the tires of all the wheels can be inflated to a uniform pressure, thereby overcoming a difficulty heretofore experienced of having the tires unequally inflated, which results, obviously, in the wheels running unevenly. Such a device will obviously also prevent any particular tire becoming more flattened than another, so as to render it liable to be rim-cut.

I carry out my invention as follows: A frame or a support of any suitable construction (indicated at $a$) is attached to the vehicle in any proper manner. The driving-shaft of the power propelling the vehicle is indicated at $b$. The cylinder of the pump is indicated at $c$ and its piston at $d$. The cylinder is made reciprocatory upon the piston. To drive the piston-cylinder, I provide a gear $e$, which is made adjustable in any suitable manner upon the support $a$. The driving-shaft $b$ is provided with a pinion $f$ to mesh with the gear $e$ when the gear $e$ is thrown into engagement with the pinion. The gear $e$ is connected, as by a connecting-rod $g$, with the cylinder, said rod being eccentrically connected with said gear. Guides $h$ $h$ are preferably employed, carrying the cylinder or upon which the cylinder reciprocates, said guides provided with a head or other analogous device (indicated at $i$) carrying the gear $e$, said head being adjustable in the support $a$. To this end the support is provided with a depending bracket $j$, constructed with an elongated orifice $k$, in which the head of the guides is movable to carry the gear $e$ into and out of mesh with the pinion on the drive-shaft. The guides are connected at their forward ends, as indicated at $l$, the connection $l$ having a jointed engagement with the support, as indicated at $m$. I do not limit myself, however, to any specific manner of making the gear $e$ adjustable, as I contemplate any suitable means for throwing the gear into and out of mesh with the pinion on the driving-shaft as coming within the scope of my invention.

I do not limit myself to any particular manner of engaging the connecting-rod with the cylinder. It may conveniently be done, however, by engaging upon the cylinder a divided band or clamp $n$, constructed to be applied to the cylinder, its ends being secured together in any suitable manner, as by a bolt and nut, (indicated at $p$.) This band on one side thereof may encircle one of the guides, the opposite side thereof engaging the opposite guide in any desired manner.

Attached to the piston-rod is any suitable connection, as a flexible connection $q$, provided with any suitable means for attaching the same to the tire-valve for the purpose of inflating the tire, such a connecting device being indicated at $r$. I prefer also to construct the connecting device $r$ with a safety-valve of any suitable description (indicated at $s$) so arranged that when the tire has been inflated to the proper degree the air-pressure will be relieved through the safety-valve. The safety-valve, however, may be located in the flexible connection or elsewhere in connection with my pump attachment in any suitable manner.

Any suitable means may be employed for bringing the gear $e$ into mesh with the pinion on the driving-shaft—as, for example, a lever $t$. Any suitable means may be employed, however, for this purpose.

The operation of the device will now be understood. When the automobile is moving, the gear $e$ will be thrown out of mesh with the pinion on the driving-shaft. When it is desired to inflate the tires or any given tire, proper engagement of the flexible connection is made therewith, the vehicle being stationary, and the gear $e$ is brought into mesh with the pinion on the drive-shaft. The inflation of the tire will then be readily accomplished. The flexible connection may be of sufficient length to be connected with any one of the tires. A portion of the vehicle-body is indicated at $u$. The piston preferably reciprocates through the connection $l$.

It will be understood that the piston-rod is made hollow or with an internal channel, (indicated at $w$ in dotted lines, Fig. 1,) said channel opening through the piston-head into the cylinder.

I do not limit myself solely to the pump and its driving mechanism being attached to an automobile or to be driven by the driving-shaft of an automobile-engine or other driving mechanism.

What I claim as my invention is—

1. The combination with a vehicle provided with inflatable tires and with a vehicle-motor having a driving-shaft, of a gear upon said shaft, an air-pump, a support for the pump, guides adjustable upon the support provided with a gear to engage the gear upon said shaft, means to connect the pump to the tires to inflate the tires, and means to throw the pump driving-gear out of operation with the gear upon said driving-shaft when the vehicle is in motion, and into operation when the vehicle is standing still.

2. The combination with a vehicle having a motor, and inflatable tires, of a pump, a support for the pump provided with guides, mechanism actuated by the vehicle-motor, said pump consisting of a piston-rod and a cylinder carried between said guides, the pump-cylinder arranged to be reciprocated by said mechanism when the vehicle is standing still, means to connect the pump to each one of the tires to inflate the tires, and means to throw the pump into and out of operation.

3. Inflating mechanism for an automobile or similar vehicle provided with inflatable tires comprising a support, a reciprocatory cylinder and a piston-rod, and means to connect the piston-rod with the tires to inflate the tires.

4. The combination with a vehicle provided with a motor and with inflatable tires, of a pump, mechanism to operate the pump-cylinder actuated by the vehicle-motor when the vehicle is standing still, means to connect the pump with the tires to inflate the tires, a support for the pump and its operating mechanism provided with guides, a movable clamp engaging said guides to carry the pump-cylinder, and means to shift said support to throw the pump-operating mechanism into and out of operation.

5. Inflating mechanism for an automobile or similar vehicle provided with inflatable tires comprising a support, oscillatory guideways jointedly connected with said support at one end thereof, a pump carried by said guideways, and means to connect the pump with the tires to inflate the tires.

6. The combination with a support of a pump, oscillatory mechanism to carry the pump having a jointed engagement with the said support, and means to actuate the pump.

7. The combination with a support, of a pump, oscillatory mechanism to carry the pump having a jointed engagement with said support, gear carried by said oscillatory mechanism to actuate the pump, and means to actuate said gear.

8. The combination with a vehicle provided with a vehicle-motor, of an air-pump provided with a cylinder and its piston, a support for the pump provided with guides, a clamp movable upon said guides to carry the cylinder, driving-gear to actuate the pump-cylinder driven by the motor, a connecting-rod connecting the clamp with the driving-gear, and means to throw the pump driving mechanism into and out of operation.

9. The combination with an automobile or similar device provided with a vehicle-motor, of an air-pump provided with a cylinder and its piston, driving-gear to actuate the pump-cylinder driven by the driving-shaft of the vehicle-motor, a connecting-rod connecting the pump-cylinder with the driving-gear, and means to throw the pump driving mechanism into and out of operation.

In testimony whereof I have signed this specification in the presence of two subscribing witnesses.

SAMUEL N. RAPP.

Witnesses:
N. S. WRIGHT,
M. L. SIMMONS.